United States Patent Office 2,869,425
Patented Jan. 20, 1959

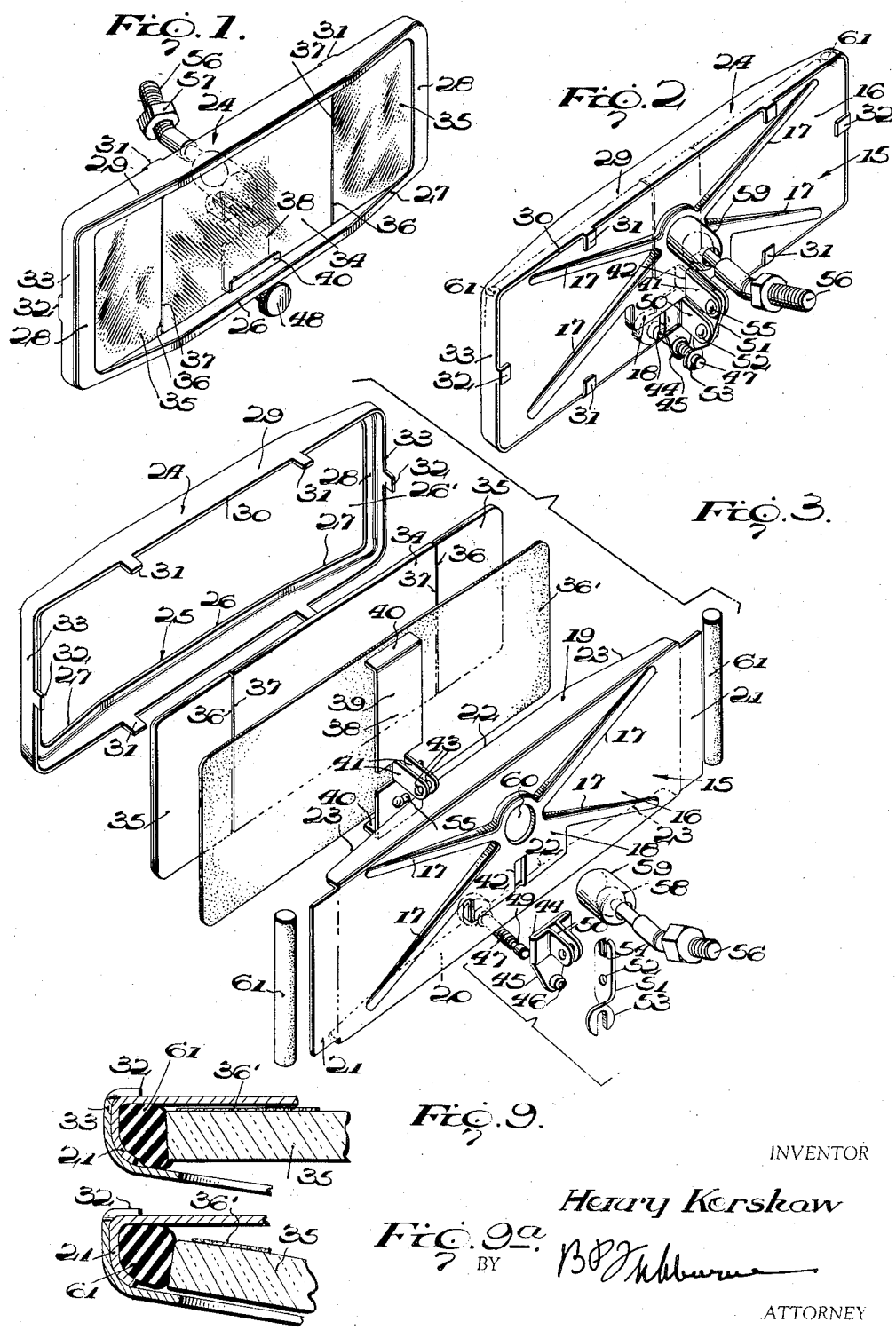
Jan. 20, 1959  H. KERSHAW  2,869,425
REAR VIEW MIRROR FOR VEHICLES
Filed Oct. 29, 1953  2 Sheets-Sheet 1
INVENTOR
Henry Kershaw
BY
ATTORNEY

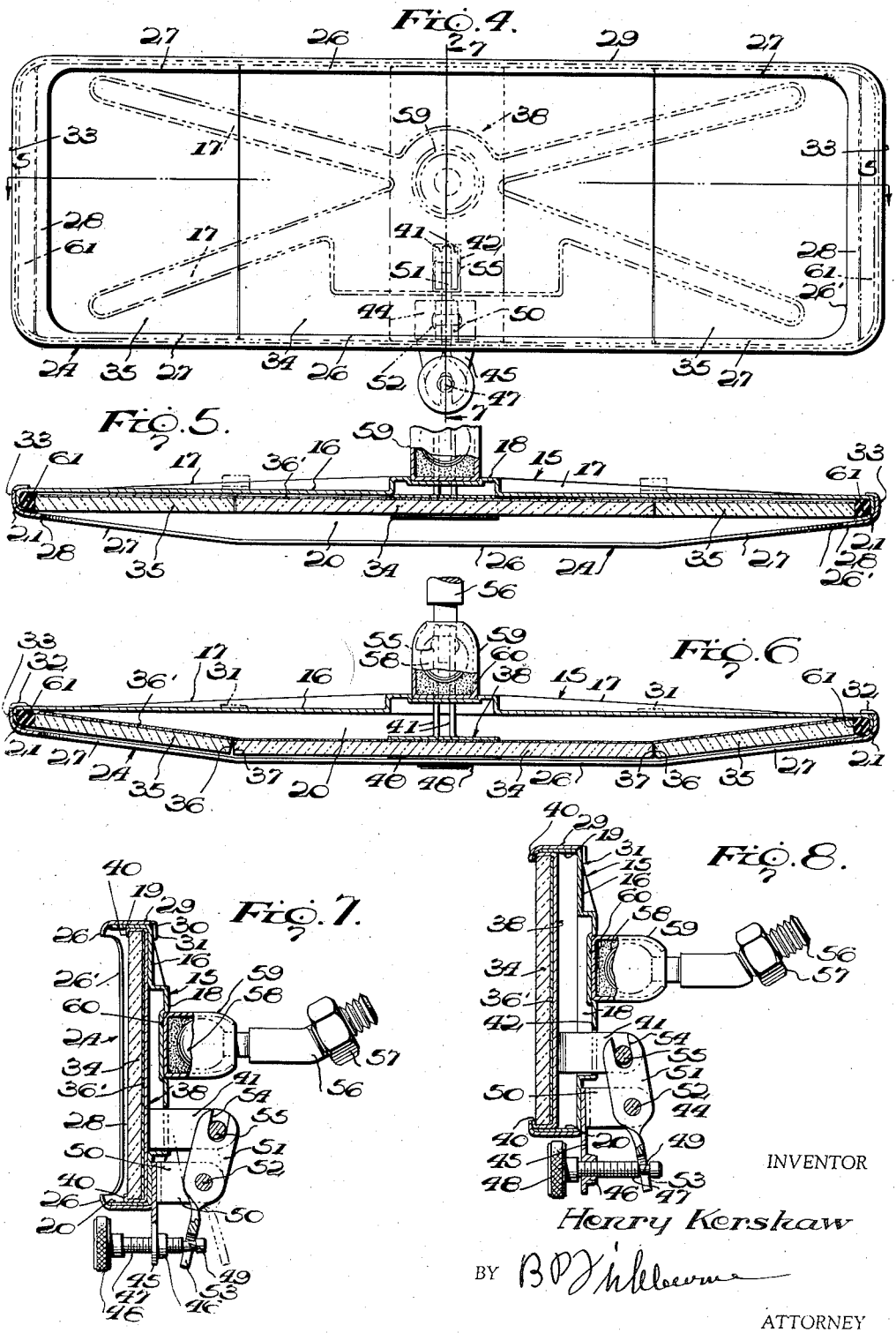

2,869,425

REAR VIEW MIRROR FOR VEHICLES

Henry Kershaw, Belleville, N. J.

Application October 29, 1953, Serial No. 389,028

2 Claims. (Cl. 88—87)

My invention relates to rear view mirrors for vehicles, such as automobiles and the like.

An important object of the invention is to provide a rear view mirror capable of reflecting an image directly behind the mirror and also reflections behind and near the sides of the mirror.

A further object of the invention is to provide simplified and reliable means for hingedly connecting adjacent mirror sections, to reduce blind spots to a minimum.

Another object of the invention is to provide means to pivotally connect and mount the mirror sections so that they may be held in selected angularly adjusted positions without rattling or moving.

A further object is to provide resilient means opposing longitudinal movement of the end mirror sections, whereby they are held under tension, and to so connect the mirror sections that the thrust caused by the resilient means is imparted directly to the mirror sections rather than to the hinging means.

A still further object of the invention is to provide a rear view mirror which is simplified and compact in construction, readily adjustable, and practical for large scale manufacture.

Other objects and advantages of the invention will be apparent during the course of the following description.

In the accompanying drawings, forming a part of this application, and in which like numerals are employed to designate like parts throughout the same, Figure 1 is a front perspective view of a rear view mirror embodying the present invention, Figure 2 is a rear perspective view of the same, Figure 3 is an exploded perspective view of the mirror, Figure 4 is a front elevation of the mirror on an enlarged scale, Figure 5 is a horizontal longitudinal section taken on line 5—5 of Figure 4, Figure 6 is a similar section through the mirror with the mirror sections in their forwardmost adjusted positions, Figure 7 is a transverse vertical section taken on line 7—7 of Figure 4, Figure 8 is a similar section showing the mirror sections in their forwardmost adjusted positions, Figure 9 is an enlarged fragmentary horizontal detail section through one end mirror section and associated elements with the mirror section rearwardly adjusted, and Figure 9a is a similar detail section showing the mirror section adjusted forwardly at an angle to the back of the casing.

In the drawings, where for the purpose of illustration is shown a preferred embodiment of the invention, the numeral 15 designates generally a rear casing section or holder formed of sheet metal, or the like, and being generally rectangular and somewhat elongated, as shown. The rear casing section 15 has a rear wall or body portion 16 which is generally flat, and preferably provided with shallow rearwardly struck ribs 17, arranged as shown to provide stiffness. A central portion 18 of the rear wall 16 is likewise rearwardly offset somewhat, as shown, and the inner ends of the ribs 17 are integral with and flush with the offset portion 18, as shown. Top and bottom longitudinal flanges 19 and 20 are formed integral with the rear wall 16 and project forwardly thereof, at right angles thereto, and the flanges 19 and 20 preferably extend for the entire length of the finished casing section 15. End transverse extensions 21 are formed upon the partially completed rear casing section 15, and are preferably integral therewith, and the extensions 21 are subsequently bent or rolled about resilient packing elements to be described. Central or intermediate portions of the flanges 19 and 20 have their forward edges 22 parallel with the rear wall 16, and end portions of the flanges 19 and 20, upon opposite sides of the central portions taper toward the opposite ends of the wall 16, and have their forward edges 23 arranged at an angle of convergence to the wall 16, as shown.

A forward casing section or frame 24 is provided for engagement rearwardly over the rear casing section 15, and the casing section 24 is rectangular, elongated and preferably formed of sheet metal, or the like. The casing section 24 is rearwardly open, and has a forward wall 25, provided with a large rectangular opening 26', extending for the major portion of the length and width of the casing section 24, as shown. Bounding the opening 26', the forward wall 25 has upper and lower central or intermediate forwardly offset parallel portions 26. Near the ends of the casing section 24, and on opposite sides of the intermediate wall portions 26, rearwardly converging wall portions 27, parallel with the edges 23 and coextensive therewith lead to and are integrally connected with end transverse wall portions 28, arranged at right angles to the wall portions 26 and 27, and offset rearwardly with respect to the wall portions 26. It is thus seen that the forward wall 25 comprises a narrow marginal wall or flange forming the boundary of the rectangular opening 26', see Figure 3. The forward casing section 24 further comprises a marginal rectangular wall 29, integral with the forward wall 25 and projecting rearwardly thereof, for telescopic engagement over the finished rear casing section 15. The marginal wall 29 is preferably formed integral with the forward wall 25, as shown. The rear marginal edge 30 of the marginal wall 29 is spaced uniformly from the forward wall sections 26, around the entire perimeter of the casing section 24, and the marginal wall 29 is preferably substantially coextensive with the flanges 19 and 20 of the rear casing section 15. Pairs of longitudinally spaced rearwardly projecting tabs 31 are formed upon the rear edge 30 of the casing section 24, intermediate the ends of the casing section, and similar tabs 32 are integrally formed upon the end portions 33 of the marginal wall 29 and likewise extend rearwardly of, and are preferably arranged at the transverse center of the forward casing section. The tabs 31 and 32 are bendable over the rear wall 16 of the rear casing section in assembly, as will be described hereinafter.

The reflecting elements of my rear view mirror include an intermediate or central elongated rectangular mirror section 34 which is flat, and has a length equal to the lengths of the wall sections 26. The width of the mirror section 34 is substantially equal to the distance between the opposite longitudinal sides of the marginal wall 29, with just enough clearance provided to accommodate holding means, to be described, between the top and bottom edges of the mirror section 34 and marginal wall 29. End rectangular mirror sections 35, shorter than the intermediate section 34 are provided, and the inner ends 36 of the end mirror sections 35 are adapted to abut the ends 37 of the intermediate section 34. The mirror sections 34 and 35 are formed separate, as shown, and preferably constitute sections of silvered plate glass, or the like. If preferred, the mirror sections 34 and 35 may be formed of highly polished metal of the same thickness as the glass mirror sections, or if preferred, they may be formed of relatively thin metal, provided at their meeting or abutting edges with transverse flanges of the same width as the thickness of the mirror sections 34 and 35.

I mount the three mirror sections 34 and 35 upon a flexible thin backing sheet 36' of rubber, friction tape, adhesive tape or the like. The backing sheet 36' is rectangular and coextensive with the three mirror sections 34 and 35, when the same are arranged in the same plane, as shown in Figure 3. The backing sheet 36' is adhesively secured to the rear faces of the mirror sections 34 and 35 with cement or the like, and preferably substantially covers their rear faces. The backing sheet 36' constitutes the means for hingedly connecting the mirror sections 34 and 35, and no mechanical hinges are employed for this purpose. With the described arrangement, the abutting ends 36 and 37 of the mirror sections may actually contact in assembly, and the resulting construction substantially entirely eliminates blind spots at the junctions of the mirror sections which would ordinarily be caused by mechanical hinges, or the like. Only the hairline caused by the abutting ends 36 and 37 of the three mirror sections interrupts the otherwise continuous expanse of mirror produced by the mirror sections 34 and 35.

An operating bracket or holder 38 for the intermediate mirror section 34 is provided and comprises a flat strip or plate 39 of sheet metal, or the like, arranged against the rear side of the backing sheet 36', and extending from the top to the bottom of the mirror section 34, preferably at the longitudinal center of the same. Forwardly projecting top and bottom extensions 40 are integrally secured to the plate 39, and are bendable over the top and bottom edges of the intermediate mirror section 34 and backing sheet 36', in assembly, as best shown in Figures 7 and 8. With this arrangement, the bracket 38 is rigidly secured to the intermediate mirror section 34.

A pair of rearwardly projecting spaced parallel ears 41 are struck from the plate 39, and adapted to extend rearwardly through a slot 42, formed in the rearwardly offset wall portion 18 of the rear casing section 15. The ears 41 are preferably arranged somewhat nearer the bottom edge of the mirror section 34 than the top edge of the same, as shown. The ears 41 are apertured near their rear ends, as at 43, for a purpose to be described.

Means are provided to adjust the intermediate mirror section 34 forwardly and rearwardly within the casing after assembly of the parts. Such means comprises a bracket 44, welded or otherwise rigidly secured to the rear wall 16 of the rear casing section 15, directly below the slot 42. The bracket 44 carries a depending extension 45, integral therewith, and extending below the bottom edges of the casing sections 15 and 24, in assembly, Figures 7 and 8. The extension 45 has a screw threaded boss 46 formed thereon, for receiving an adjusting screw 47, arranged below the casing sections 15 and 24, and close to the bottoms of the same. The adjusting screw 47 is provided at its forward end with a narrow knob 48, and the screw is provided near its rear end, and rearwardly of the bracket 44 with an undercut groove 49. The bracket 44 is further provided with a pair of rearwardly extending spaced parallel apertured ears 50, integral therewith, and spaced below and close to the ears 41. An operating lever or link 51 is arranged between the apertured ears 50 and pivoted thereto at 52 for vertical swinging movement. The lever 51 has a lower slotted extension 53 formed integral therewith, and the slot of the extension 53 receives the reduced or undercut portion 49 of the adjusting screw 47. The upper end of the lever 51 is likewise slotted at 54, and engages between the apertured ears 41 of bracket 48. A pin 55 or the like extends through a slot 54 and the apertures 43, and serves to form a pivotal sliding connection between the pivoted operated lever 51 and bracket 38. The ears 41 are movable longitudinally through the slot 42 of the rear casing section 15.

In order to mount the mirror assembly adjacent to the windshield of an automobile, or the like, I provide a conventional screw threaded mounting stud 56, carrying a lock nut 57. The forward end of the stud 56 is provided with a ball head 58, rigid thereon and engageable therein a suitable ball socket or housing 59. The socket 59 has its forward end seated within a shallow recess 60, stamped in the rear wall portion 18, and rigidly secured therein by welding or the like. The entire assembly is supported by the stud 56, and has a universal swiveled connection therewith through the medium of the ball and socket arrangement.

A pair of cylindrical resilient packing elements or cushions 61 are interposed between the outer ends of the mirror sections 35 and the end extensions 21 of the rear casing section 15. After the mirror sections 34 and 35, and associated elements are introduced into the rear casing section 15, the extensions 21 are rolled forwardly about the resilient packing elements 61 to contain the same, as best shown in Figures 9 and 9a. The packing elements 61 are under constant compression in assembly, between the outer ends of the mirror sections 35 and rolled extensions 21, and the thrust imparted to the mirror sections by the resilient packing elements 61 is borne by the meeting edges 36 and 37 of the mirror sections, and not by the flexible backing sheet 36.

To assemble the device, the mirror sections 34 and 35 with the backing sheet 36' and bracket 38 applied thereto are introduced rearwardly into the rear casing section 15, and the operating means including the bracket 44, adjusting screw 47 and pivoted lever 51 are then preferably assembled. The mounting stud 56 and associated elements may then be secured to the rear casing section 15. The extensions 21 are then rolled forwardly about the resilient packings 61, which packings extend for the entire height of the mirror sections 35, as shown. The forward casing section 24 is then applied over the rear casing section 15, and the tabs 31 and 32 are bent inwardly and over the rear face of the wall 16 for permanently securing the casing sections together. It is to be noted that no screws or other separate fastener elements are employed in assembling my rear view mirror, and the provision of the resilient packings 61 renders the assembly rattleproof and quiet in operation. The construction throughout is simplified, compact and durable.

To operate and adjust the mirror, the adjusting screw 47 is turned for pivoting the lever 51 upon its pivot 52. This action shifts the bracket 38 and the intermediate mirror section 34 forwardly and rearwardly between the limits of the rear wall 16 and forward wall 25 of the casing sections. Forward and rearward movement of the intermediate mirror sections 34 automatically adjusts the angles of the end mirror sections 35, between their two limits illustrated in Figures 5 and 6 and Figures 9 and 9a. When the intermediate mirror section 34 is adjusted rearwardly for its fullest extent, so that the plate 39 engages the rear wall 16, the end mirror sections 35 lie in the same plane as the intermediate mirror section, and form therewith a substantially continuous plane rectangular mirror of maximum length. The opposed ends 36 and 37 of the mirror sections are now in flat abutting relation, and the mirror sections absorb the thrust imparted by the resilient packings 61. When the intermediate section 34 is adjusted forwardly to its fullest extent, and contacts the forward wall 25, the end mirror sections 35 are angularly disposed to the fullest extent, and converge forwardly, as shown in Figure 6. In this position, the resilient packings 61 are still under some degree of compression, as best shown in Figure 9a. The arrangement is such that the mirror sections may assume any selected intermediate adjusted positions between the two extremes shown in Figures 5 and 6, and will remain in selected adjusted positions without rattling or moving. I have found that a slight angle of approximately 1½ degrees between the intermediate and end mirror sections is sufficient to afford a wide field of vision with my mirror, although the angularity of the end mirror sections may be varied considerably more with the arrangement shown, as found desirable.

With the mirror adjusted as shown in Figure 6, objects directly to the rear of the vehicle and also to the side and rear of the vehicle may be viewed simultaneously, and a wide panoramic field of vision is afforded.

It is to be understood that the form of the invention herewith shown and described, is to be taken as a preferred example of the same, and that various changes in the shape, size and arrangement of parts may be resorted to, without departing from the spirit of the invention or scope of the subjoined claims.

Having thus described my invention, I claim:

1. A rear view mirror comprising a casing having walls and ends defining a mirror receiving chamber, said chamber having a relatively wide central portion and gradually narrowing end portions which taper toward said ends of the casing, said casing having an opening in one wall thereof to expose the mirror held within said chamber, an intermediate mirror section positioned within said relatively wide central chamber portion and shiftable bodily forwardly and rearwardly therein, end mirror sections disposed within the gradually narrowing end chamber portions and pivotally connected with the intermediate mirror section and swinging about their outer ends to selected angularly adjusted positions, resilient cushioning elements arranged between the ends of the casing and the outer ends of the end mirror sections and being compressed, and direct operating means connected with said intermediate mirror section and operable from the exterior of the casing to shift the intermediate mirror section forwardly and rearwardly, said cushioning elements yielding during the forward and rearward movement of the intermediate mirror section to allow the end mirror sections to adjust themselves laterally somewhat within said casing.

2. A rear view mirror comprising a casing having forward and rear walls and ends, said forward wall having an opening to expose the mirror, said forward wall having a forwardly offset intermediate portion spaced from the rear wall and substantially parallel therewith, the rear wall being substantially straight, said forward wall having end portions arranged at angles to the intermediate forward wall portion and converging with the rear wall toward said ends of the casing, said forward and rear walls defining within the casing a mirror chamber having a relatively wide intermediate portion and tapering end portions which gradually narrow toward said ends of the casing, an intermediate mirror section disposed within said intermediate chamber portion, end mirror sections disposed within said tapering end chamber portions and having inner ends hingedly connected with the outer ends of the intermediate mirror section, resilient compressible elements disposed in said ends of the casing and engaged by the outer ends of the end mirror sections and being compressed and constituting yielding pivots for the outer ends of the end mirror sections, and direct operating means connected with the intermediate mirror section to shift the same bodily forwardly and rearwardly in said intermediate chamber portion, said shifting of the intermediate mirror section causing the end mirror sections to pivot about said resilient compressible elements within the tapering chamber portions and to have their angular relationship with the intermediate mirror section changed.

References Cited in the file of this patent

UNITED STATES PATENTS

| | | |
|---|---|---|
| 434,950 | Pratt | Aug. 26, 1890 |
| 1,650,161 | Streiff | Nov. 22, 1927 |
| 2,473,231 | Wager | June 14, 1949 |
| 2,498,065 | Budreck | Feb. 21, 1950 |
| 2,664,785 | Roehrig | Jan. 5, 1954 |
| 2,736,231 | Bauersfeld | Feb. 28, 1956 |

FOREIGN PATENTS

| | | |
|---|---|---|
| 390,289 | France | July 24, 1908 |